United States Patent [19]

Ziegler et al.

[11] Patent Number: 5,490,254

[45] Date of Patent: Feb. 6, 1996

[54] MIL-STD-1553 INTERFACE DEVICE HAVING AUTONOMOUS OPERATION IN ALL MODES

[75] Inventors: Jeff P. Ziegler, Colorado Springs; John W. Pressprich, Woodland Park; Anthony F. Jordan; Timothy D. Hornback, both of Colorado Springs; Gregory S. Carr, Boulder, all of Colo.

[73] Assignee: United Technologies Corporation, Hartford, Conn.

[21] Appl. No.: 232,851

[22] Filed: Apr. 22, 1994

Related U.S. Application Data

[63] Continuation of Ser. No. 972,182, Nov. 4, 1992, abandoned.

[51] Int. Cl.[6] ................................................. G06F 11/00
[52] U.S. Cl. ........................... 395/280; 364/DIG. 1; 364/232.8; 364/232.9; 364/240; 364/240.2; 364/241; 370/85.1
[58] Field of Search ............................. 395/325, 250, 395/275, 575; 370/85.1

[56] References Cited

U.S. PATENT DOCUMENTS

| 4,136,400 | 1/1979 | Caswell et al. | 395/325 |
|---|---|---|---|
| 4,453,229 | 6/1984 | Schaire | 395/250 |
| 4,500,933 | 2/1985 | Chan | 360/69 |
| 4,638,451 | 1/1987 | Hester et al. | 395/275 |
| 4,695,952 | 9/1987 | Howland | 395/325 |
| 4,805,137 | 2/1989 | Grant et al. | 395/325 |
| 4,959,782 | 9/1990 | Tulpule et al. | 395/575 |
| 5,012,404 | 4/1991 | Pressprich | 395/800 |
| 5,093,910 | 3/1992 | Tulpule et al. | 395/575 |
| 5,111,423 | 5/1992 | Kopec, Jr. et al. | 395/500 |
| 5,111,450 | 5/1992 | Cooledge et al. | 371/29.5 |
| 5,131,272 | 7/1992 | Minei et al. | 73/431 |
| 5,181,201 | 1/1993 | Schauss et al. | 370/85.1 |
| 5,223,788 | 6/1993 | Andreano et al. | 371/15.1 |
| 5,601,704 | 3/1991 | Narup et al. | 370/85.3 |

Primary Examiner—Jack B. Harvey
Assistant Examiner—Ayaz R. Sheikh

[57] ABSTRACT

An integrated circuit ("IC") implementing the three MIL-STD-1553 defined functions of bus controller, remote terminal, and monitor terminal implements a register-based architecture that allows for autonomous operation in all three modes, one or more modes being operable simultaneously, operation of the IC being autonomous in that the IC initializes operating variables in its internal registers and in external memory upon power up.

15 Claims, 8 Drawing Sheets

MIL-STD-1553 INTERFACE DEVICE HAVING AUTONOMOUS OPERATION IN ALL MODES

CROSS REFERENCE TO RELATED APPLICATIONS

This is continuation of application Ser. No. 07/972,182, filed on Nov. 4, 1992, abandoned.

This application discloses and claims material which is related to (U.S. Ser. No.) 07/971,435 titled A MIL-STD-1553 Interface Device Having Command Illegalization; (U.S. Ser. No.) 07/971,439 titled A MIL-STD-1553 Interface Device Having Ping-Pong Buffering; (U.S. Ser. No.) 07/971,748 titled A MIL-STD-1553 Interface Device Having a Bus Controller Opcode Set; (U.S. Ser. No.) 07/971,434 which is now U.S. Pat. No. 5,367,641 titled A MIL-STD-1553 Interface Device Having a Bus Controller Minor Frame Timer; and (U.S. Ser. No.) 07/971,428 which is now U.S. Pat. No. 5,325,359 titled A MIL-STD-1553 Interface Device Having Concurrent Remote Terminal and Monitor Terminal Operation, filed on even date herewith.

TECHNICAL FIELD

The invention relates to interface devices for the MIL-STD-1553B data bus standard, and more particularly to a single integrated circuit ("IC") interface device implementing the three MIL-STD-1553B functions of bus controller, remote terminal, and monitor terminal.

BACKGROUND ART

MIL-STD-1553B ("1553") defines an asynchronous serial, command/response digital data bus on which messages are time division multiplexed among users. The transmission medium is a twisted wire cable pair. 1553 specifies all of the electrical characteristics of the receivers, transmitters, and cable used to implement the bus, as well as the complete message transmission protocol. 1553 is designed for high integrity message exchanges between unattended equipment. The messages are highly repetitive, and their content and periodicity are all pre-planned.

The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 was originally published in 1973 for use on the F-16 military aircraft program. The current version of 1553 is MIL-STD-1553B, Notice 2, implemented in 1986.

A number of companies provide components which implement the communication interface functions of 1553. Among them is the Model UT1553B BCRTM device, provided by United Technologies Microelectronics Center, Inc. ("UTMC") Colorado Springs, Colo. The BCRTM is a single IC that implements the three functions of 1553: bus controller, remote terminal, and monitor terminal. For more information on the UT1553B BCRTM consult the 1553 Product Handbook provided by UTMC, and U.S. Pat. No. 4,805,137, both of which are incorporated herein by reference.

However, as 1553 popularity and usage increases and IC fabrication techniques improve, there is a desire for 1553 interface devices that provide for a greater number of 1553 functions implemented on a single IC, and for increased flexibility in meeting 1553 interface design requirements.

DISCLOSURE OF INVENTION

An object of the present invention is to provide a single integrated circuit that contains all three of the defined MIL-STD-1553B functions.

Another object of the present invention is to provide the single MIL-STD-1553B integrated circuit having improved features that result in reduction of printed circuit board space, enhanced software flexibility, and reduced system host processor overhead for most MIL-STD-1553B data bus applications.

According to the present invention, an integrated circuit ("IC") implementing the three MIL-STD-1553 defined functions of bus controller, remote terminal, and monitor terminal implements a register-based architecture that allows for autonomous operation in all three modes, one or more modes being operable simultaneously, operation of the IC being autonomous in that the IC initializes operating variables in its internal registers and in external memory upon a reset condition of the IC.

The present invention has utility for MIL-STD-1553B applications for many military and aerospace systems applications including avionics, intra-vehicle communications, electronic warfare, electronic counter measures, radar, guidance and control, and satellites.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
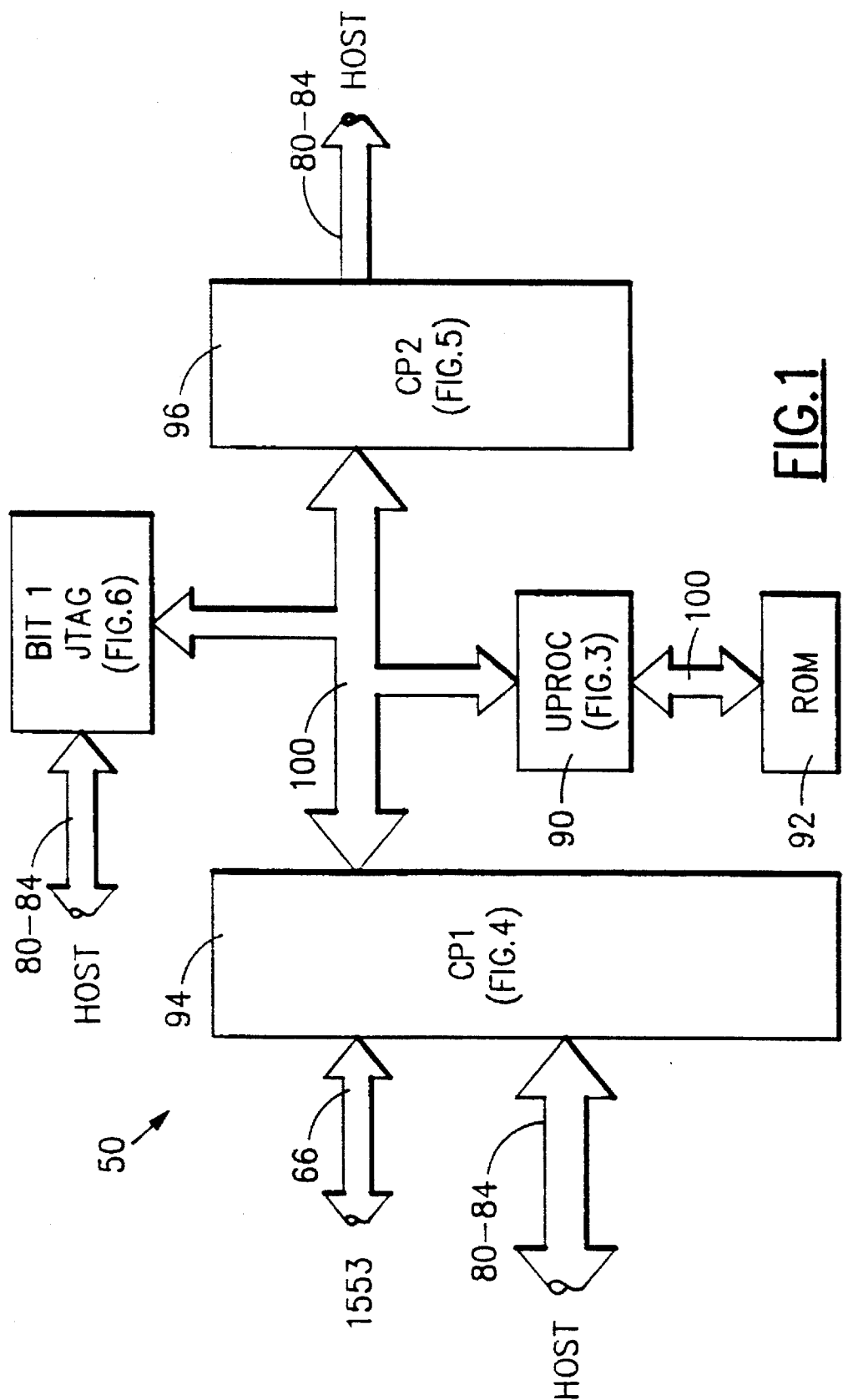
FIG. 1 is a block diagram of an IC according to the invention implementing the three defined MIL-STD-1553B functions.

FIG. 1 illustrates a block diagram of an IC 50 that implements the three 1553 terminal functions; i.e., bus controller, remote terminal, and monitor terminal. The IC 50 may be the Model UT69151, provided by United Technologies Microelectronics Center, Inc. ("UTMC"), Colorado Springs, Colo. For detailed information on the Model UT69151 IC, including device pin descriptions, timing diagrams, packaging, and DC and AC electrical specifications, consult the UT69151 Product Handbook available from UTMC, which is incorporated herein by reference.

Figure 2:
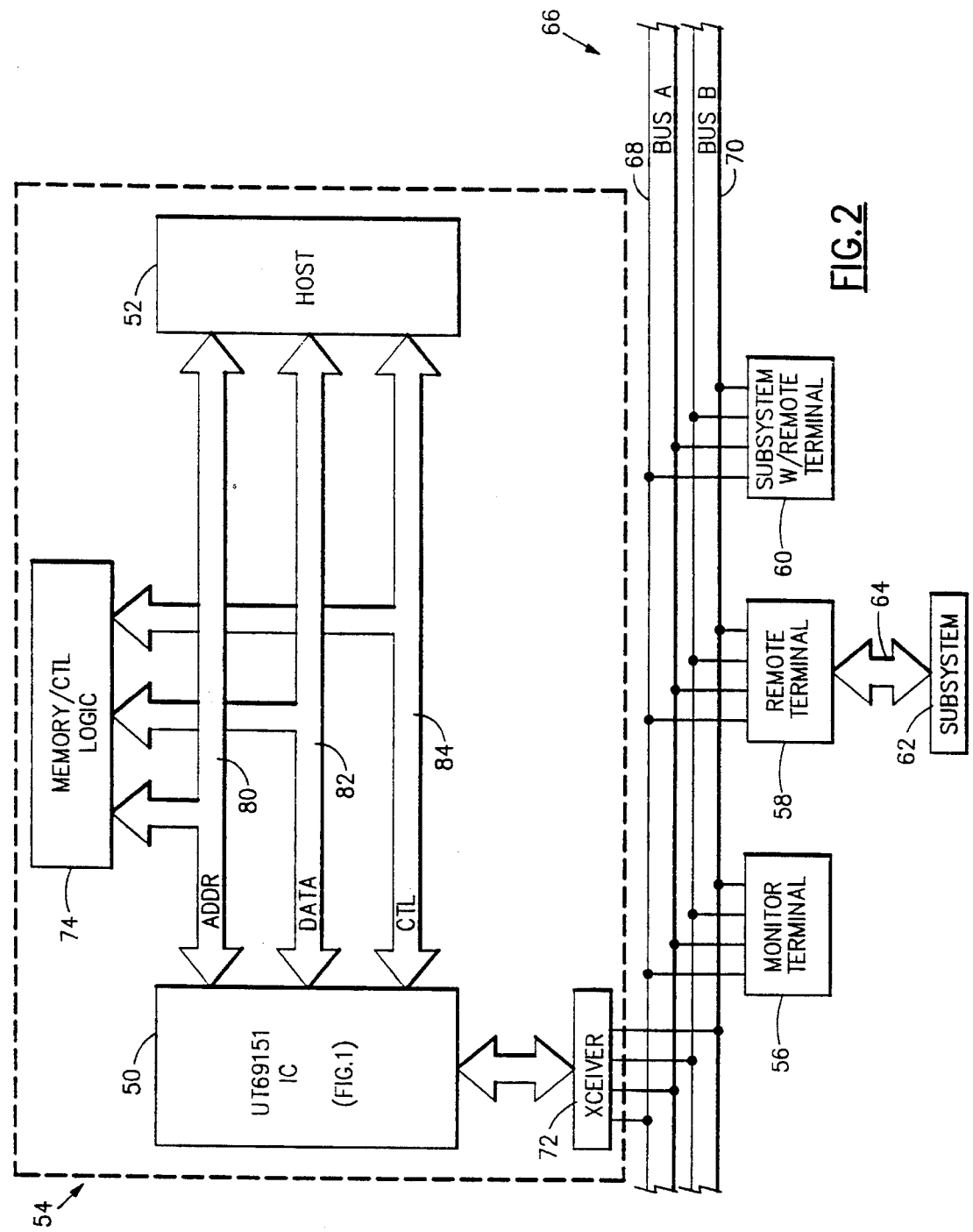
FIG. 2 is a block diagram of the integrated circuit of FIG. 1 interfaced to a host.

FIG. 2 illustrates the IC 50 of FIG. 1 interfaced to a host subsystem 52. The host may comprise a central processing unit ("CPU") along with writable memory and other circuitry. The subsystem may comprise an unattended piece of equipment 54 on a military aircraft, e.g., sensors, displays, or mission computers. The IC may be operating in, e.g., the bus controller mode of 1553. As such the bus controller initiates and directs all data flow on the 1553 bus.

The aircraft may have a plurality of other unattended equipment connected to the 1553 bus. For example, illustrated in FIG. 2 is a monitor terminal 56 and two remote terminals 58, 60; each represents a separate piece of aircraft equipment connected to the 1553 bus. The monitor terminal 56 receives communications on the 1553 bus and extracts selected information therefrom. The monitor terminal receives data for off-line purposes such as flight test, maintenance, and mission analysis.

A first remote terminal 58 is physically separate from a subsystem 62, thereby operating as a line replaceable unit ("LRU"). The terminal 58 is connected to the subsystem 62 by a bus 64. A second remote terminal 60 is embedded within a subsystem in a similar fashion to the IC 50 within the equipment 54. There can be up to 32 remote terminals connected to a single 1553 bus. The monitor terminal 56 and two remote terminals 58, 60 may each be implemented with a corresponding IC and transceiver similar to the IC and transceiver for the equipment 54 described hereinafter.

Also illustrated in FIG. 2 is a dual-redundant 1553 bus 66 comprising two physical buses, bus A 68 and bus B 70. In conformance with 1553, each bus 68, 70 comprises a twisted pair of wires. Data is transmitted on the bus 66 between pieces of equipment in the known Manchester II data encoding format at a rate of one (1) megabits per second using the half duplex mode.

The IC 50 interfaces with each bus 68, 70 through a transceiver IC 72, which may comprise, e.g., the Model UT63M125 component from UTMC. The transceiver 72 translates the electronic signals from the IC to the appropriate 1553 voltage and current levels for the 1553 bus. The IC and transceiver together comprise what 1553 defines as a "terminal". A terminal is the electronic module necessary to interface the 1553 data bus with the subsystem, and is the only electronics necessary to transfer data between the data user and the 1553 data bus.

The IC interfaces to the host through either a Direct Memory Access ("DMA") or pseudo dual-port configuration. Illustrated in FIG. 2 is the DMA configuration, wherein the IC shares a common memory 74 with the host 52. The memory 74, which includes any associated control logic (e.g., arbitration logic), along with the IC and host are all interconnected through address, data and control buses 80, 82, 84. The IC 50 gains access to memory through an arbitration process using specific signals within the control bus 84. A pseudo dual-port configuration is described in the UT69151 Product Handbook from UTMC.

Referring to FIG. 1, the UT69151 IC from UTMC is a single-chip monolithic IC implemented on a 1.2 micron radiation-hardened CMOS gate array. The IC utilizes 430,000 transistors on a 495 by 495 mil die and operates at 24 MHz. The IC is built around a standard 16-bit RISC ("Reduced Instruction Set") microprocessor ("UPROC") 90 and a 3.5 K by 32 bit ROM ("Read-Only Memory") 92. The powerful RISC UPROC 90 provides for automatic message handling, message status, general status, and interrupt information. The register-based interface architecture of the IC provides for many programmable functions as well as extensive information pertinent to device maintenance. The UPROC is illustrated in greater detail hereinafter with respect to FIG. 3. The IC can access up to 64K by 16 bits of external memory. Also, the IC can operate either with a tightly coupled host 52 (as illustrated in FIG. 2), or it can operate autonomously, as described in detail hereinafter.

1553 specifies three types of message words that may be transmitted on the 1553 bus: a command word, status word, and data word. Each type of word contains 20 bits covering 20 bit times (i.e., 20 microseconds). Each word begins with a three bit sync, followed by 16 information bits, and ending with a single parity bit. 1553 also specifies ten different message formats using the three types of words.

A command word is transmitted only by a bus controller and is always the first word in a message. The first five information bits of the command word comprise the remote terminal address. Next is a remote terminal transmit/receive bit, and five bits that either designate a subaddress to the remote terminal or use of mode codes. The next five bits indicate either the data word count or a mode code.

A status word, which is always the first word in a response sent by a remote terminal, contains the five bit remote terminal address followed by an 11-bit status field. A data word, which may follow a command or status word, contains a 16-bit binary coded data value.

The UT69151 IC 50 includes two coprocessors; CP1 94 and CP2 96, which control the interface to the 1553 bus 66 and host 52. CP1 94 and CP2 96 are illustrated in greater detail hereinafter in FIGS. 4 and 5, respectively. The movement of data within the IC is controlled by the UPROC 90 by "move to" and "move from" instructions. Generally, 1553 data is routed from CP1 into UPROC and processed, or placed into CP1 from UPROC for Manchester II encoding or other control functions. When data needs to be accessed or retrieved from external memory, data is moved to or from CP2, which is responsible for DMA transfers. All data is moved internally within the IC along a bus 100 that contains address, data, control and status information.

To assist the host in managing the 1553 interface, 15 interrupt conditions can generate an informational interrupt to the host. Between message processing, the IC enters a low power standby mode that shuts down all clocking in UPROC and ROM until further command processing is required.

The IC microcode resides in the ROM 92, which utilizes the normal gate array underlayers. The ROM cell requires only the normal gate array personalization layers to construct, which simplifies placement on the array. To program the ROM, only the contact layer of the gate array mask needs to be changed.

Figure 3:
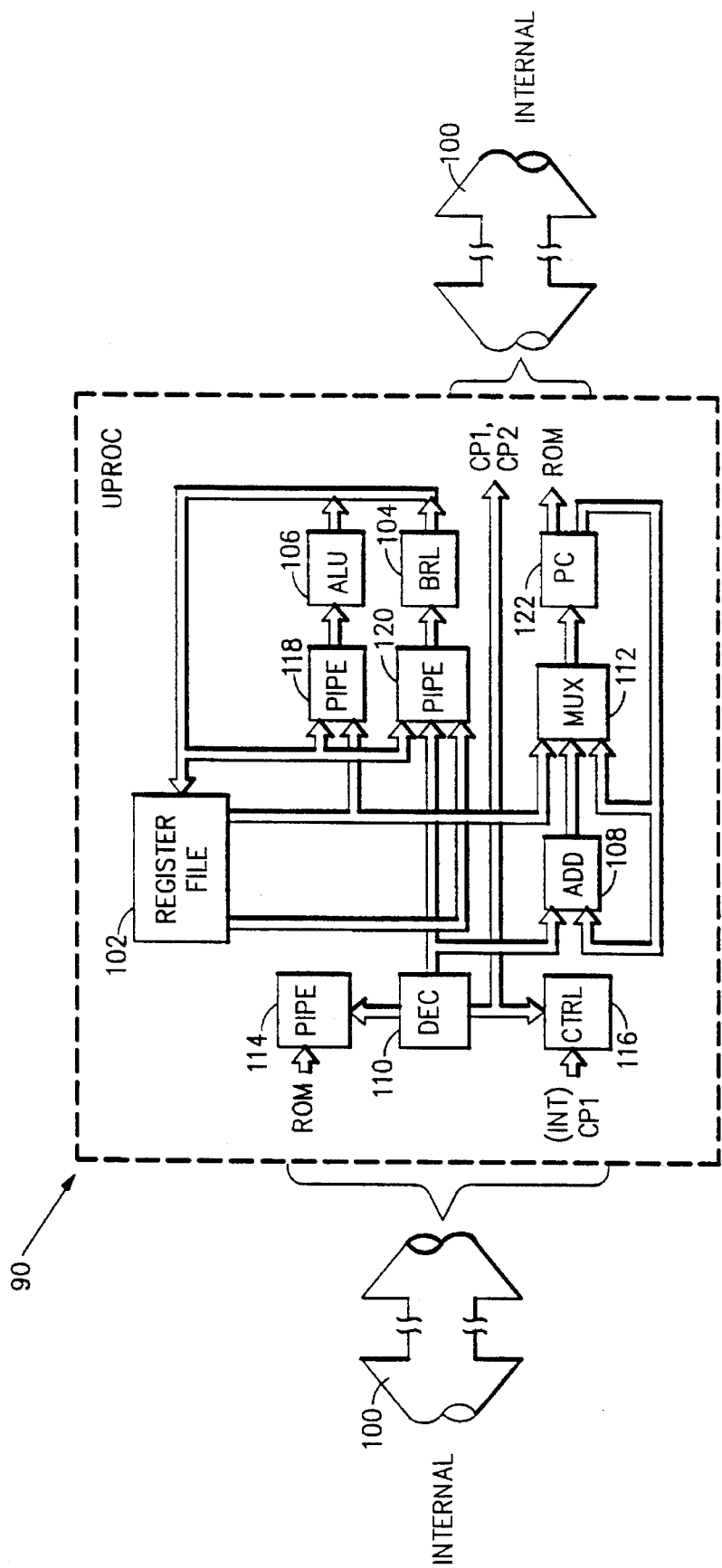
FIGS. 3–6 are block diagrams of separate portions of the IC of FIG. 1.

Referring to FIG. 3, the UPROC 90 comprises a standard architecture, including 30 general purpose registers and two auxiliary storage registers in a register file 102. Six interrupt inputs from CP1 with individually programmable interrupt vectors provide fast interrupt servicing. A synchronous bus interface to both coprocessors transfers data to and from the UPROC. The microcode instructions from ROM are provided to the UPROC. Other components within the UPROC include a barrel shifter 104, arithmetic logic unit 106, adder 108, decrementer 110, multiplexer 112, and several pipeline stages 114, 118, 120. Control circuitry 116 for the interrupts is included, along with a 16-bit program counter 122 that accesses the microcode stored in ROM.

Figure 4:
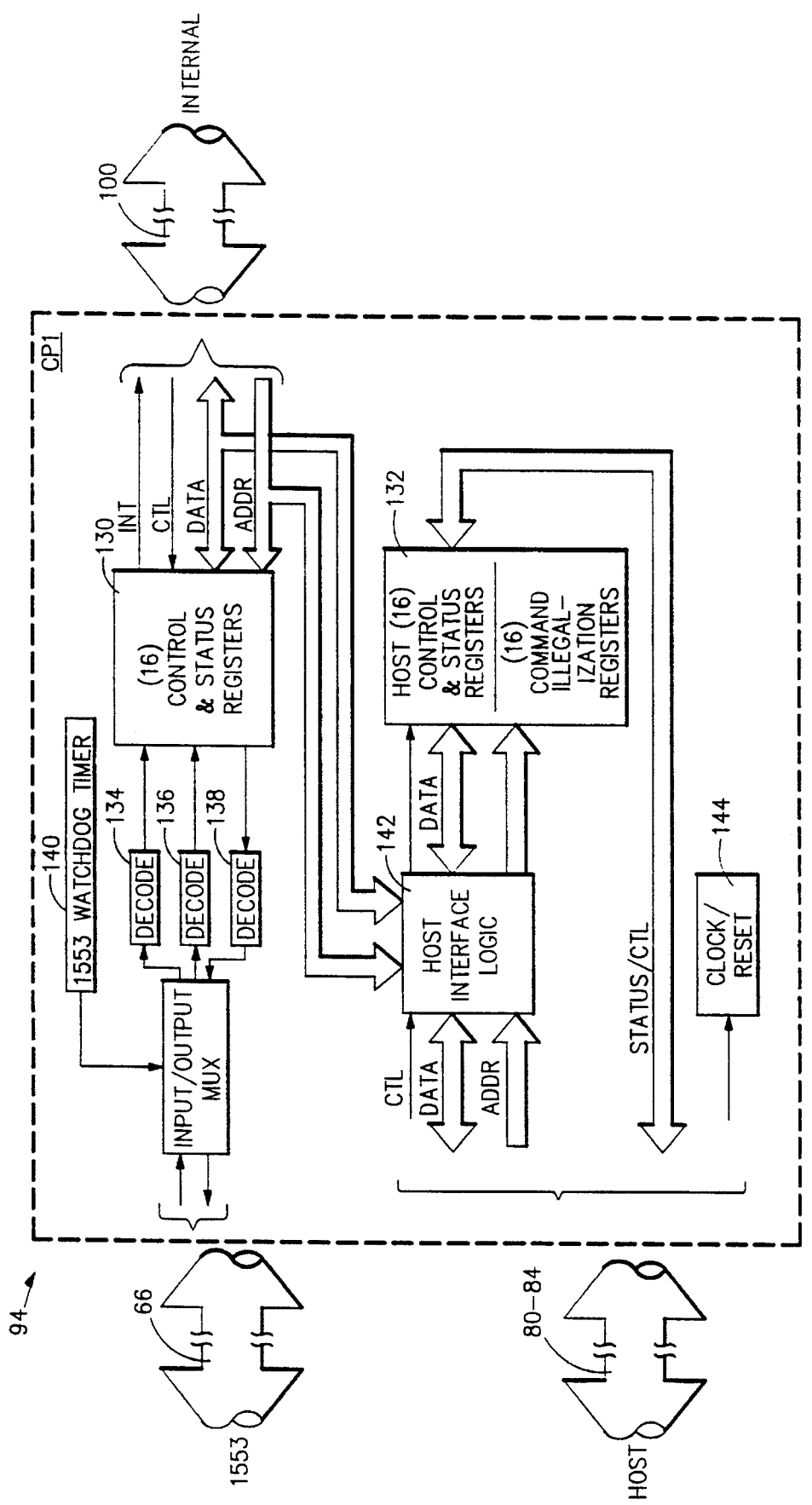

Referring to FIG. 4, CP1 94 includes addressable locations for 1553 bus control, data and interrupt generation, comprising 16 programmable control, status and interrupt registers 130. CP1 also includes 32 16-bit dual-port read/ write registers 132 for host control. The host registers are divided into 16 control registers and 16 remote terminal illegalization registers. Detailed descriptions of all CP1 host registers are found in the UT69151 Product Handbook available from UTMC. An interrupt to the UPROC is generated whenever the host is attempting to change the configuration of the IC.

CP1 also includes dual-redundant Manchester II decoders 134, 136 that monitor the 1553 bus for command, status and data word patterns, and provide for complete Manchester II error detection. Each decoder 134, 136 checks for the proper sync pulse and Manchester waveform, edge skew, correct number of bits, and parity. Each decoder generates an interrupt to the UPROC when either Manchester sync and five bits, or a data word are received. An encoder 138 generates Manchester II true and complement data and provides interrupts to the UPROC indicating data ready or data overflow conditions.

CP1 includes a 760 microsecond fail-safe, watchdog timer 140 to prevent babbling conditions by limiting the time that the encoder transmits. The 1553 command processing is interrupt driven from the encoder and decoder. When an interrupt condition occurs, one of the six hardware interrupts to the UPROC is asserted. CP1 also includes host interface logic 142, which arbitrates access to CP1's internal registers. A clock and reset circuit 144 is also included.

To access CP1's host registers, the host uses the first half system clock cycle while the UPROC uses the second half clock cycle to perform register writes. Register reads may be performed concurrently. The host can determine the current operational configuration of the IC, mask interrupts, clear interrupts, modify the Tag/Frame timer clock, and illegalize 16 remote terminal subaddresses.

Figure 5:
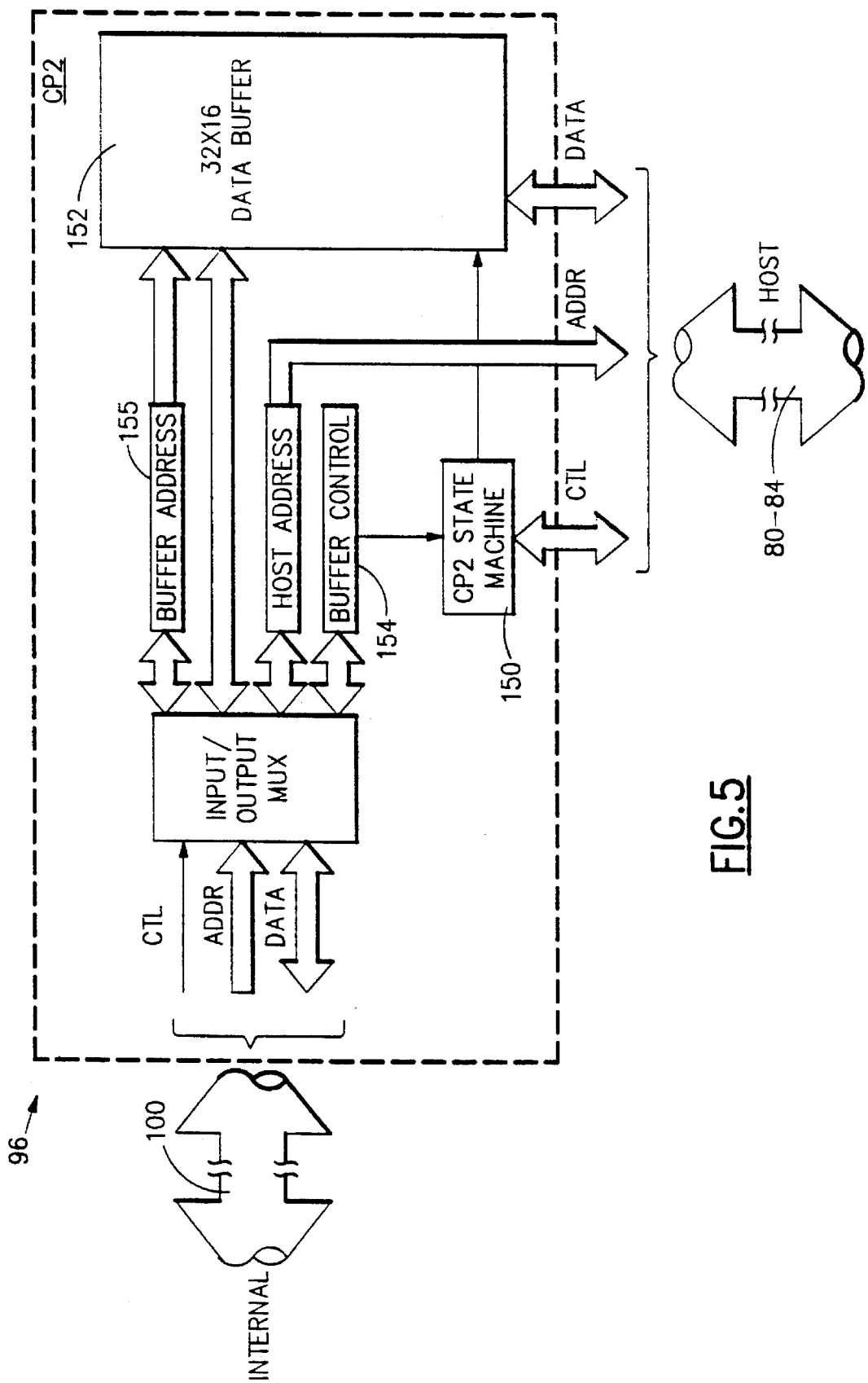

Referring to FIG. 5, CP2 96 interfaces between the IC and external memory 74 (FIG. 2). A standard DMA interface 150, including a DMA sequencer and DMA control registers, interrupt control logic, and a 32 word read/write data buffer 152 are incorporated in CP2. The data buffer 152 provides single stage data buffering for external memory read/writes in a stack. Sequential stack accesses automatically increment through the data until the stack is empty. A buffer start address must be loaded before accessing the stack.

Data transfers are controlled by a single control register 154 and referenced to a 16-bit memory index 155. Subsystem DMA operations use the value of this memory index 155 as the host memory address, which automatically increments after every host memory read or write operation. The DMA control register 154 contains all interrupt and control bits as well as a word count for data transfers.

Figure 6:
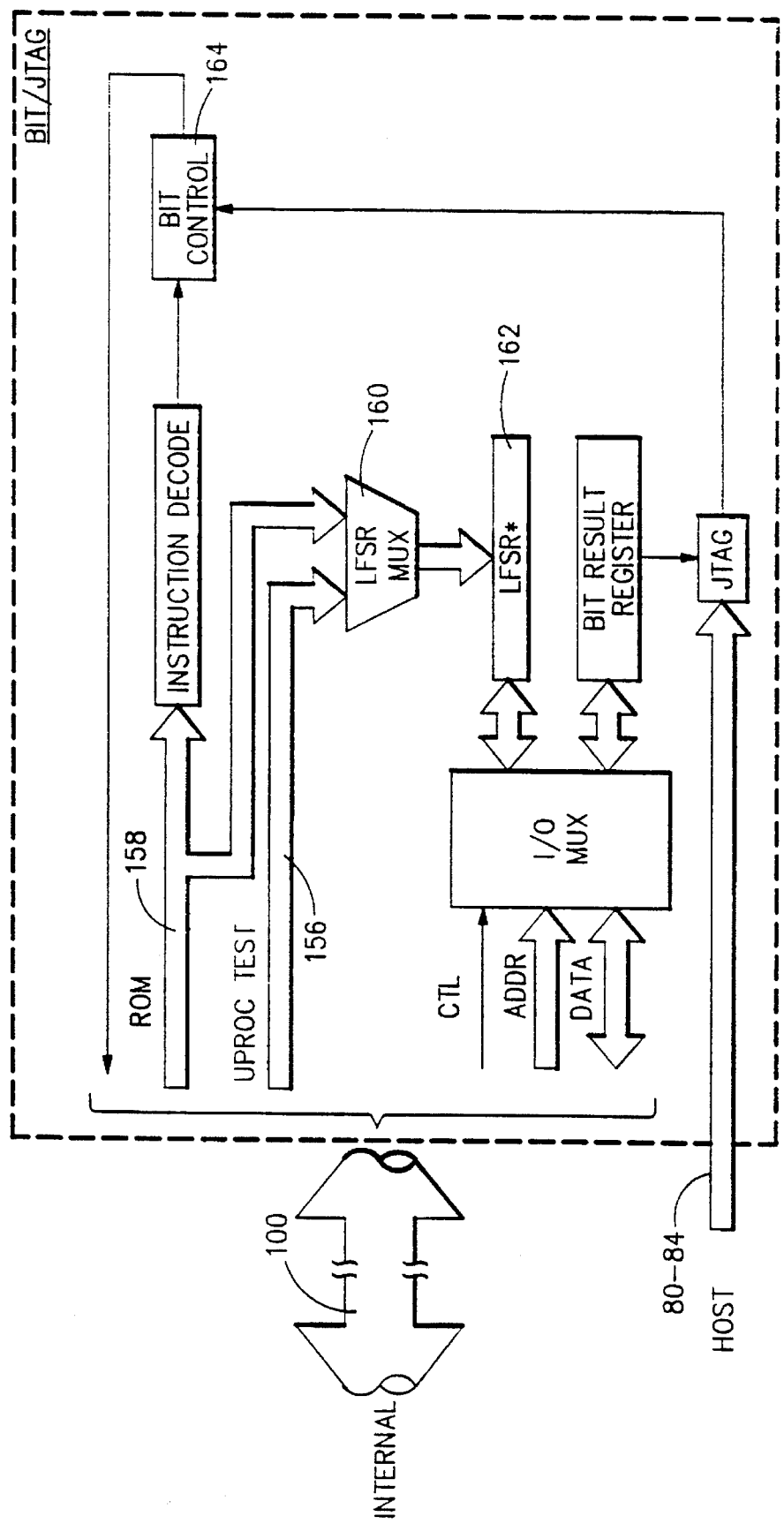

Referring to FIG. 6, there illustrated is the logic for the Built In Test ("BIT") and JTAG functions. A number of UPROC self-test points 156 are input along with instructions 158 to a linear feedback shift register ("LFSR") multiplexer 160, which selects one input to be fed to a LFSR 162, which generates a signature of test points within the IC. BIT control circuitry 164 sequences CP1, CP2, ROM and the UPROC through the entire BIT sequence.

When utilized as a bus controller, the IC is an interface device linking the 1553 bus 66 to a host 52. As defined in 1553, the bus controller initiates all communications on the bus. Sixteen of the 32 internal CP1 host programmable registers direct bus controller operation.

Figure 7:
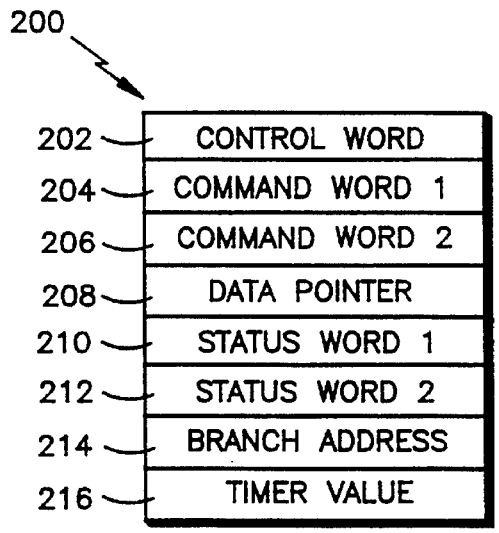
FIG. 7 is an illustration of a command block structure of data storage for IC operation in the bus controller mode.

Referring to FIG. 7, bus controller operation is based on a command block 200 structure. Each command word transmitted over the 1553 bus by the bus controller must have a command block 200 associated therewith. The command blocks are stored in external memory 74 (FIG. 2) and are accessed therefrom when command execution is started. Each command block comprises an eight word structure having sixteen bits per word, consisting of one control word 202, two command words 204, 206, a data pointer 208, two status words 210, 212, a branch address 214, and a timer value 216; all stored in eight contiguous external memory locations.

Each command block 200 is stored contiguously in memory. The host (or an external ROM for autonomous UT69151 IC operation) must initialize each location within a command block, except for the two status words 210, 212, which are updated as command words are transmitted and corresponding status words are received.

The 16-bit control word 202 contains a four-bit field that defines opcodes. The remaining twelve bits in the control word provide for status and control. Information in the control word allows the bus controller to control the commands transmitted over the 1553 bus. The control word 202 allows the bus controller to transmit commands on a specific channel, perform retries, initiate remote terminal to remote terminal transfers, and interrupt on certain conditions.

Opcodes are instructions to the bus controller that define its operation. The UT69151 IC provides for 16 different opcodes. Table 1 lists the opcodes available for the UT69151 IC operating in the bus controller ("BC") mode. Listed are the binary values of the four control word bits, along with the name of the opcode and its definition.

TABLE 1

| | |
|---|---|
| 0000 | End of List: instructs the BC that the end of the command block has been encountered. Command processing stops and the interrupt is generated if enabled. |
| 0001 | Skip: instructs the BC to load a message timer with the value in the timer value location in the command block. The BC then waits the specified time before proceeding to the next command block. This opcode allows for scheduling of specific time between message execution. No command processing takes place. |
| 0010 | Go To: instructs the BC to go to the command block as specified in the branch address location of the command block. No command processing takes place. |
| 0011 | Built-in Test ("BIT"): instructs the BC to perform an internal BIT. If the BC passes the BIT, then processing of the next command will continue. If the BC fails the BIT, then processing stops and an interrupt is generated if enabled. No command processing takes place. |
| 0100 | Execute block, Continue: instructs the BC to execute the current command block and proceed to the next command block. This opcode allows for continuous operation. |
| 0101 | Execute block, Branch: instructs the BC to execute the current command block and unconditionally branch to the location specified in the branch address location of the command block. |
| 0110 | Execute block, Branch on Condition: instructs the BC to execute the current command block and branch only if the condition is met. If no conditions are met, the opcode appears as an execute and continue. |
| 0111 | Retry on Condition: instructs the BC to perform automatic retries, as specified in the control word, if particular conditions occur. If no conditions are met, the opcode appears as an execute and continue. |
| 1000 | Retry on Condition, Branch: instructs the BC to perform automatic retries, as specified in the |

TABLE 1-continued control word, if particular conditions occur. If
the conditions are met, the BC retries. Once all
retries have been executed, the BC branches to the
location as specified in the branch address
location. If no conditions are met, the opcode
appears as an execute and branch.
1001 Retry on condition, Branch if all Retries Fail:
instructs the BC to perform automatic retries, as
specified in the control word, if particular
conditions occur. If the conditions are met and
all retries fail, the BC branches to the location
specified in the branch address location. If no
conditions are met, the opcode appears as an
execute and continue.
1010 Interrupt, Continue: instructs the BC to
interrupt and continue processing on the next
command block. No 1553 processing occurs.
1011 Call: instructs the BC to go to the command block
as specified in the branch address location
without processing this block. The next command
block address is saved in an internal register so
that the BC may remember one address and return
to the next command block. No command processing
takes place.
1100 Return to Call: instructs the BC to return to the
command block address saved during the Call
opcode. No command processing takes place.
1101 Reserved: the BC will generate an illegal
opcode interrupt, if enabled, and automatically
stop execution is a reserved opcode is used.
1110 Load Minor Frame Timer ("MFT"): instructs the BC
to load the MFT with the value stored in the
timer location of the current command block. The
MFT will be loaded after the previous MFT has
decremented to zero. After the MFT is loaded
with the new value, the BC will proceed to the
next command block. No command processing takes
place.
1111 Return to Branch: instructs the BC to return to
the command block address saved during a Branch
opcode. No command processing takes place.

Regarding the two command words 204, 206, most 1553 messages use only the first command word 204; thus, it is the only command word initialized. However, in a remote terminal to remote terminal ("RT-RT") transfer, the first command word is the receive command and the second command word is the transmit command. Thus, both command words must be initialized for such transfers.

The data pointer 208 indicates the first location in external memory to either store or retrieve data words associated with the message for the command block. The bus controller can store or retrieve the exact specified number of data words, thus making efficient use of external memory space. Note that for RT-RT transfers, the bus controller uses the data pointer as the location in external memory to store the transmitted data in the transfer. One common application for the data pointer is when the bus controller needs to send the same data words to several remote terminals. Here, each command block associated with those messages contains the same data pointer value, and, therefore, transmit and retrieve the same data.

Regarding the two status words 210, 212, as the remote terminal responds on the 1553 bus to the bus controller's command, the corresponding status word sent by the remote terminal is stored in status word 1. In a remote terminal to remote terminal transfer, the first status word is that of the transmitting remote terminal while the second status word is that of the receiving remote terminal. Thus, both status words are recorded for such transfers.

The branch address 214 contains the starting location of a branch which simply allows the bus controller to branch to another location in memory when certain opcodes are used. The timer value 216 contains a 16-bit data word to be used with opcodes that implement timer functions. These timer opcodes allow for scheduling of specific time between message execution.

The host (or external ROM for autonomous operation) determines the first command block by setting the start address of this block in a command block pointer register that is one of the 16 host programmable registers in CP1. The command blocks will then execute in a contiguous manner as long as no "go to", "branch", "call", or "return" opcodes are used. With the use of the opcodes, almost any external memory configuration is possible. Several command blocks may be linked together to form a command frame. After execution of the first command block is complete, the command block pointer register is automatically updated to point to the address associated with the next command block. Following the command block locations in external memory may be the memory locations required to store the data words.

Monitor terminal operation of the IC is based upon a monitor block structure similar to the command block structure of the bus controller. This is because, in many applications, the monitor terminal may be required to function as a backup bus controller. To initialize the IC as a monitor terminal, one of the 16 programmable internal host registers of CP1 must be initialized either by the host, or by external ROM for autonomous operation. The remaining 15 registers offer many programmable monitor terminal functions and allow the host access to a wide range of information.

When the IC is operating non-autonomously (i.e., under control of the host), the host must initialize the starting location of the monitor block, along with other registers among the 16 programmable internal registers of CP1. From then on, the IC will build a monitor block for each message it receives over the 1553 bus.

Figure 8:
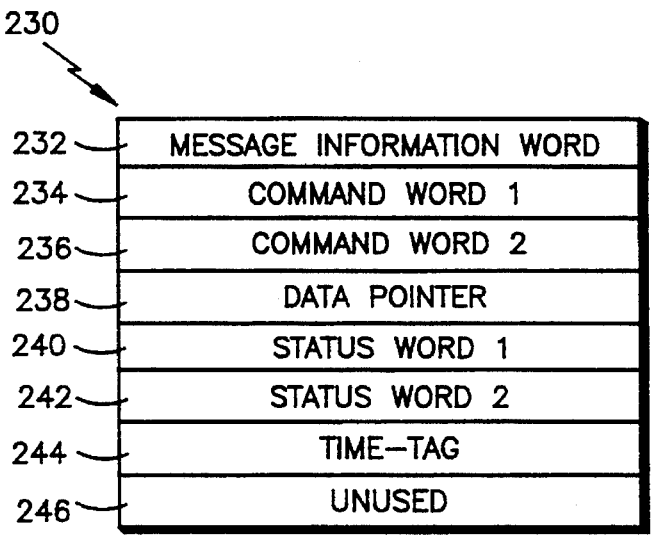
FIG. 8 is an illustration of a message block structure of data storage for IC operation in the monitor terminal mode.

Referring to FIG. 8, the monitor blocks for message definition are located in external memory. Each monitor block 230 requires eight contiguous memory locations for each message. These eight locations include, in order, a message information word 232, two command words 234, 236, a data pointer 238, two status words 240, 242, a time-tag 244, and an unused location 246.

The message information word 232 provides information about the message that the monitor terminal extracted. Regarding the two command words 234, 236, in non RT-RT messages, only the first command word 234 is stored. However, in a RT-RT transfer, the first command word is the receive command and the second command word is the transmit command. Thus, both command words are stored for such transfers.

The data pointer 238 indicates the first location in external memory to store data words associated with the message for the monitor block. Note that the data associated with each individual message is stored contiguously. The monitor terminal stores the exact specified number of data words, thus making efficient use of external memory space. Note that for RT-RT transfers, the monitor terminal uses the data pointer as the location in external memory to store the transmitted data in the transfer.

Regarding the two status words 240, 242, as the remote terminal responds on the 1553 bus to the bus controller's command, the corresponding status word is stored in status word 1 240. In a RT-RT transfer, the first status word is that of the transmitting remote terminal while the second status word is that of the receiving remote terminal. Thus, both status words are recorded for such transfers.

The time-tag location 244 is the time associated with the particular message and is stored into this location at the end of message processing. The last location 246 in the monitor block 230 is unused.

The host (or external ROM for autonomous operation) determines the first monitor block by setting the start address of this block in a command block pointer register that is one of the 16 host programmable registers 132 in CP1 94 (FIG. 4). The message information word allows the remote terminal to tell the host on which bus the command was received, whether the message was a RT-RT transfer, and conditions associated with each message. The monitor terminal also stores each command word associated with the message. For each command, the data pointer is read to determine where to store data words. The monitor terminal stores data sequentially from an initial location, and also stores each status word associated with the message.

As messages are received, the monitor terminal arbitrates for the memory bus. After message receipt, the monitor terminal starts post-processing, which begins with arbitration for the memory bus. The monitor terminal performs a DMA burst during post-processing. An optional interrupt log entry is performed after a monitor block is entered.

Figure 9:
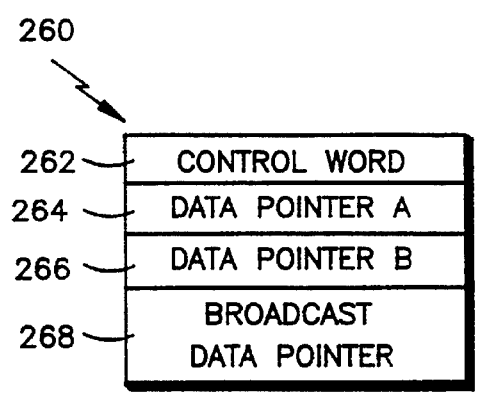
FIG. 9 is an illustration of a descriptor block structure of data storage for IC operation in the remote terminal mode.
Figure 10:
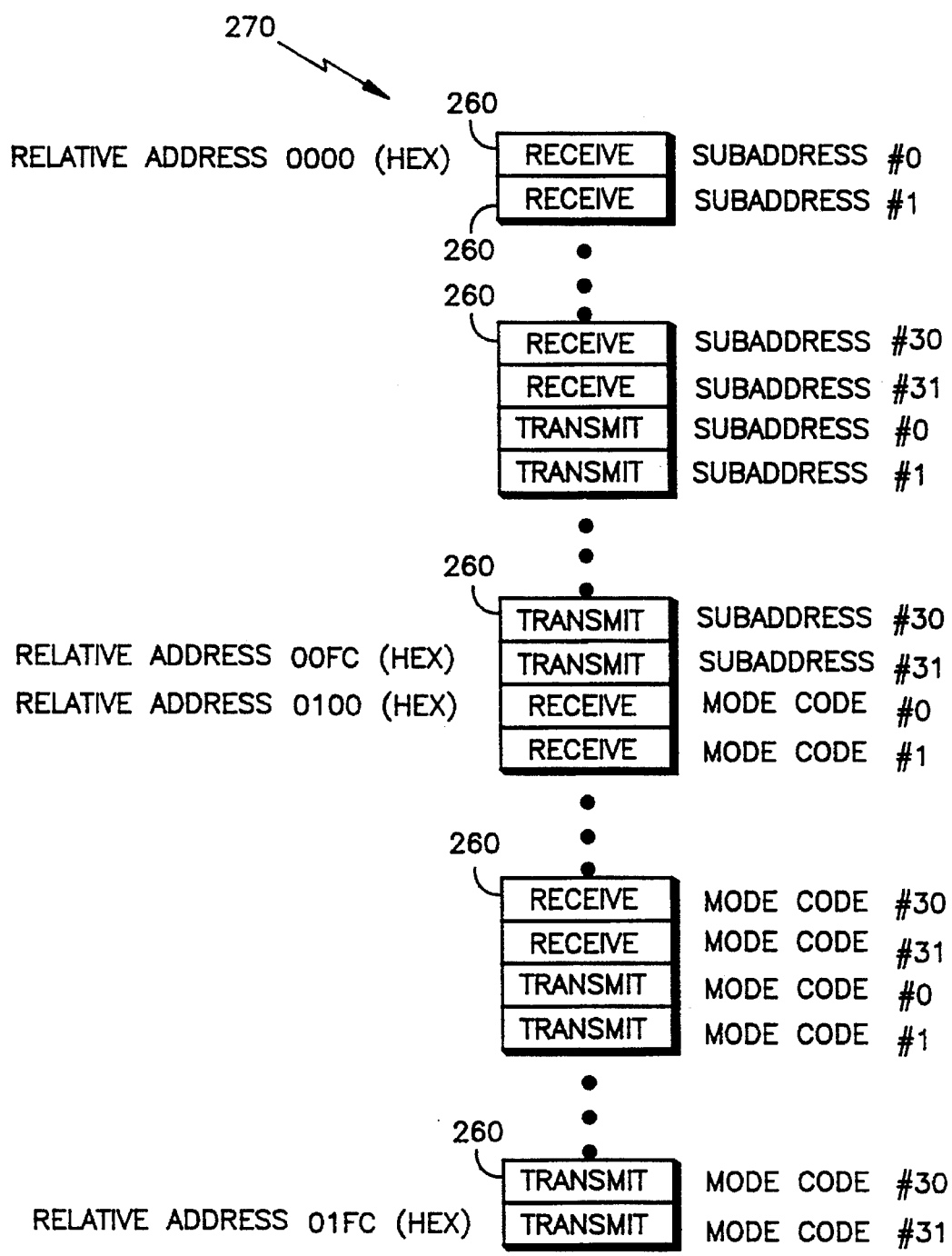
FIG. 10 is an illustration of a descriptor table comprised of a plurality of descriptor blocks of FIG. 9.

When utilized as a remote terminal, the UT69151 IC 50 processes messages using data supplied in CP1's 32 internal registers and in external memory. Referring to FIG. 9, the remote terminal accesses a four word descriptor block 260 stored in external memory. The descriptor block 260 is accessed at the beginning and end of command processing. Multiple descriptor blocks are sequentially stored in memory to form a descriptor table 270 (FIG. 10).

The host (or external ROM for autonomous operation) controlling remote terminal operation allocates 512 consecutive memory spaces for the subaddress and mode code descriptor table 270. Each subaddress and mode code has a descriptor block 260 reserved in memory. Also, each subaddress and mode code is assigned a descriptor block for receive and transmit commands. Each four word descriptor block contains a control word 262, data pointer A 264, data pointer B 266, and broadcast data pointer 268. The top of the descriptor table can reside at any address location.

The remote terminal is linked to the descriptor table via the descriptor address register, which is one of the 16 programmable host registers in CP1. The descriptor address register contains an address that points to the top of a particular descriptor block. The remote terminal uses the T/R bit, subaddress/mode field, and mode code in the command word received from the 1553 bus to select one descriptor block within the descriptor table for message processing.

Control word 262 information allows the remote terminal to generate interrupts, buffer messages, and control message processing. For a receive command, the data pointer 264 is read to determine the top of the data buffer. The remote terminal stores data sequentially from the top of the data buffer plus two locations. When processing a transmit command, the data pointer 264 is read to determine where data words are retrieved. The remote terminal retrieves data words sequentially from the address the data pointer designates plus two address locations.

The broadcast data pointer 268 allows for separate storage of non-broadcast data from broadcast data per 1553. The host enables or disables this feature via the control word in the descriptor block. When disabled, the non-broadcast and broadcast data is stored via either of the data pointers 264, 266. For transmit commands, the broadcast data pointer is not used. The remote terminal does not transmit any information on the receipt of a broadcast transmit command.

The remote terminal reads the descriptor block during command processing. and arbitrates for the memory bus. After receiving control of the bus, the remote terminal reads the control word 262 and three data pointers 264–268. The remote terminal then surrenders control of the bus back to the bus master. The remote terminal then begins the acquisition of data words for either transmission or storage.

After transmission or reception, the remote terminal begins post-processing. Command post-processing begins with arbitration for the memory bus. The remote terminal performs a DMA burst during post-processing. An optional interrupt log entry is performed after a descriptor update. During the descriptor update, the remote terminal modifies the control word and updates the data pointers if no message errors occurred during the message transaction. Reception of a broadcast command, with no message errors, results in the update of the broadcast data pointer.

Referring to FIG. 2, the UT691515 IC 50 of the present invention allows for autonomous operation by configuring itself for subsequent operation upon a reset condition of the IC of all internal IC logic. Autonomous operation is operation of the IC without any intervention by the host 52. The information needed for configuration is located in external memory 74. Autonomous operation is enabled by the logic level at one of the external pin connections to the IC. The pin may comprise one of the signals on the bus 80–84. It is a simple matter to assert this pin to the proper logic level by having the pin hardwired. Then, upon a reset condition of the IC, the IC examines the logic level of this pin and automatically initializes itself for autonomous operation.

For each of the three 1553-defined modes of operation (i.e., bus controller, remote terminal, monitor terminal), the initialization procedure is different. However, for all three modes of operation, the information needed for initialization is located in a non-volatile (e.g., PROM, ROM) portion of external memory 74.

During initialization of the IC for the remote terminal mode of operation, the IC loads its internal registers with information from PROM and establishes the descriptor table 270 (FIG. 10) in the volatile portion (e.g., RAM) of the external memory. Internal registers not used for remote terminal operation are initialized to zero. The starting address for the descriptor table is loaded into one of the 16 host programmable registers of CP1.

The IC accesses 544 consecutive PROM memory locations for remote terminal initialization: 32 for internal IC register initialization; 256 for subaddress descriptor block information; and 256 for mode code descriptor block information. The IC accesses these 544 locations in 32-word blocks. The IC arbitrates for the bus 82–84. Once access is granted the IC reads the 32 words from PROM, then transfers the words into RAM. The IC does not release the bus until all 544 PROM locations are transferred. Once initialization is complete, the IC can then respond to 1553 commands sent to it on the 1553 bus 66.

During initialization of the IC for the monitor terminal mode of operation, the IC loads its internal registers with information from PROM. For concurrent remote terminal and monitor terminal operation, the IC loads all of its internal registers for both modes of operation and transfers the descriptor table from PROM to RAM.

During initialization of the IC for the bus controller mode of operation, the IC loads its internal registers with information from PROM and establishes the command blocks in RAM. The starting address for the command blocks is loaded into one of the 16 host programmable registers of CP1. The number of command blocks to be generated in RAM is loaded into one of the 16 host programmable registers of CP1.

The UT69151 IC 50 can address 64K of external memory. However, the address space (as seen by the IC) for PROM can be concurrent with that for RAM through the use of an external pin of the IC which takes on a predetermined binary logic level when the IC desires to access PROM. In this way the PROM and RAM can be overlayed. Detailed timing information regarding this memory overlay scheme is found in the UT69151 Product Handbook from UTMC.

The present invention has been described for use with the MIL-STD-1553 data bus interface standard. However, it is to be understood that the invention is not limited to such standard and it may be used with any type of bus interface system in accordance with the teachings herein.

Although the invention has been illustrated and described with respect to a best mode embodiment thereof, it should be understood by those skilled in the art that the foregoing and various other changes, omissions, and additions in the form and detail thereof may be made without departing from the invention.

We claim:

1. An integrated circuit for interfacing a system with a MIL-STD-1553 data bus, the system having a host computer and volatile memory, wherein the integrated circuit is defined by a mode signal and a system reset signal and operates in one of several system selectable MIL-STD-1553 operating modes, said operating modes including 1) a bus controller mode, 2) a remote terminal mode, 3) a monitor mode and 4) concurrent monitor and remote terminal modes, said integrated circuit comprising:

nonvolatile memory containing integrated circuit initialization data;

means for receiving the mode signal indicative of the desired MIL-STD-1553 operating mode;

means for selecting an operating mode from said several MIL-STD-1553 operating modes in response to the mode signal received by said means for receiving;

means for detecting the system reset signal and for providing a reset signal which is active when the system reset signal is detected; and a microprocessor comprising;

means for autonomously reading said initialization data when said reset signal is active; and means, responsive to the reset signal, for executing a predetermined sequence of signal processing operations indicative of the operating mode said integrated circuit is commanded to operate in as defined by said mode signal.

2. The integrated circuit of claim 1 wherein said microprocessor includes a plurality of registers which are loaded with said initialization data when said reset signal is active.

3. The integrated circuit of claim 2 wherein said plurality of registers includes a data register into which the starting address for a descriptor table of data, located in said volatile memory, is written to when said reset signal is active and said mode signal is indicative of the remote terminal mode of operation.

4. The integrated circuit of claim 2 wherein said plurality of registers includes a data register into which the starting address for a plurality of command blocks of data located in said volatile memory is written when said reset signal is active and said mode signal is indicative of the bus controller mode of operation.

5. The integrated circuit of claim 2 wherein said plurality of registers includes a data register into which the starting address for a descriptor table of data, located in said volatile memory, is written to when said reset signal is active and said mode signal is indicative of concurrent remote terminal and monitor mode of operation.

6. An integrated circuit for interfacing a system with a MIL-STD-1553 data bus, the system having a host computer and volatile memory, wherein the integrated circuit is defined by a mode signal and a system reset signal and operates in one of several system selectable MIL-STD-1553 operating modes, said operating modes including 1) a bus controller mode, 2) a remote terminal mode, 3) a monitor mode and 4) concurrent monitor and remote terminal modes, said integrated circuit comprising:

nonvolatile memory containing integrated circuit initialization data;

a plurality of registers;

means for receiving the mode signal indicative of the desired MIL-STD-1553 operating mode;

means for selecting an operating mode from said MIL-STD-1553 operating modes in response to the mode signal received by said means for receiving;

means for detecting the system reset signal and for providing a reset signal which is active when the system reset signal is detected; and a microprocessor comprising:

means for reading said initialization data when said reset signal is active without the intervention of the host computer and for loading said initialization data into said plurality of registers and said volatile memory in response to said system reset signal; and means, responsive to the reset signal, for executing a predetermined sequence of signal processing operations indicative of the operating mode said integrated circuit is commanded to operate in as defined by said mode signal.

7. The integrated circuit of claim 6 wherein said plurality of registers includes a data register into which the starting address for a descriptor table of data located in said volatile memory is written to when said reset signal is active and said mode signal is indicative of the remote terminal mode of operation.

8. The integrated circuit of claim 6 wherein said plurality of registers includes a data register into which the starting address for a plurality of command blocks of data located in said volatile memory is written when said reset signal is active and said mode signal is indicative of the bus controller mode of operation.

9. The integrated circuit of claim 6 wherein said plurality of registers includes a data register into which the starting address for a descriptor table of data located in said volatile memory is written to when said reset signal is active and said mode signal is indicative of concurrent remote terminal and monitor mode of operation.

10. An integrated circuit for interfacing a system with a MIL-STD-1553 data bus, the system having a host computer and volatile memory, wherein the integrated circuit is defined by a mode signal and a system reset signal and autonomously operates in one of several system selectable MIL-STD-1553 operating modes, said several system selectable MIL-STD-1553 operating modes comprising:

(1) a bus controller mode;

(2) a remote terminal mode;

(3) a monitor mode; and (4) concurrent monitor and remote terminal modes, said integrated circuit comprising:

nonvolatile memory containing integrated circuit initialization data;

a selector, responsive to the mode signal, for selecting an operating mode from said several MIL-STD-1553 operating modes, the mode signal indicative of the MIL-STD-1553 operating mode to be selected;

a detector for detecting the system reset signal and for providing a reset signal in response to the system reset signal; and a microprocessor comprising:
 means for autonomously accessing said initialization data in response to said reset signal; and
 means, responsive to the reset signal, for executing a predetermined sequence of signal processing operations according to an operating mode selected from said several MIL-STD-1553 operating modes by said selector for selecting an operating mode in response to the mode signal.

11. The integrated circuit of claim 10, wherein said microprocessor further comprises a plurality of registers which are loaded with said initialization data in response to said reset signal.

12. The integrated circuit of claim 11, wherein said plurality of registers comprises a data register into which a starting address for a descriptor table of data, located in said volatile memory, is written to in response to said reset signal when said mode signal is indicative of the terminal mode of operation.

13. The integrated circuit of claim 11, wherein said plurality of registers comprises a data register into which a starting address for a plurality of command blocks of data, located in said volatile memory, is written to in response to said reset signal when said mode signal is indicative of the bus controller mode of operation.

14. The integrated circuit of claim 11, wherein said plurality of registers comprises a data register into which a staffing address for a descriptor table of data, located in said volatile memory, is written to in response to said reset signal when said mode signal is indicative of the concurrent remote terminal and monitor mode of operation.

15. A method for interfacing a system with a MIL-STD-1553 data bus on an integrated circuit, the system having a host computer and volatile memory, wherein the integrated circuit is defined by a mode signal and a system reset signal and autonomously operates in one of several system selectable MIL-STD-1553 operating modes, said several system selectable MIL-STD-1553 operating modes comprising:

(1) a bus controller mode;

(2) a remote terminal mode;

(3) a monitor mode; and (4) concurrent monitor and remote terminal modes, said method comprising:

storing initialization data of an integrated circuit in nonvolatile memory;

selecting an operating mode from said several MIL-STD-1553 operating modes in response to the mode signal, the mode signal being indicative of the MIL-STD-1553 operating mode to be selected;

detecting the system reset signal and generating a reset signal in response to said detected system reset signal; and autonomously accessing said stored initialization data by means of a microprocessor in response to said reset signal; and executing, in response to the reset signal, a predetermined sequence of signal processing operations according to an operating mode selected from said several MIL-STD-1553 operating modes by said means for selecting an operating mode in response to the mode signal, said executing being performed by said microprocessor.

* * * * *